Sept. 7, 1937.  F. ERNY  2,092,644

TENSION OLEO STRUT

Filed July 2, 1935  2 Sheets-Sheet 1

INVENTOR.
FRANK ERNY.
BY
ATTORNEYS.

Sept. 7, 1937.  F. ERNY  2,092,644
TENSION OLEO STRUT
Filed July 2, 1935  2 Sheets-Sheet 2

INVENTOR.
FRANK ERNY.
BY
ATTORNEYS.

Patented Sept. 7, 1937

2,092,644

UNITED STATES PATENT OFFICE 2,092,644

TENSION OLEO STRUT

Frank Erny, Kenmore, N. Y., assignor, by mesne assignments, to Curtiss-Wright Corporation, a corporation of New York Application July 2, 1935, Serial No. 29,459

3 Claims. (Cl. 188—88)

This invention relates to aircraft landing gears, and to a shock absorber suitable for use therewith.

The landing gear with which the shock absorber of this invention is adapted to be used, may be of the single strut type wherein the wheel carrying strut is hinged to the aircraft fuselage for lateral swinging. The tension shock absorber strut may then be connected between a portion of the strut and the fuselage so that, upon landing impact, the tension strut is elongated. I contemplate using a shock absorber strut of the non-reactive hydraulic type, the aircraft depending for cushioning during travel over the ground upon pneumatic tires of the balloon type which are now almost universally used in aircraft and which have adequate cushioning ability without the use of reacting shock absorbing devices.

An object of the invention is to provide a landing gear for an aircraft adapted for lateral swinging with respect to the aircraft.

A further object is to provide a tension type of shock absorber unit connecting the strut and the aircraft.

A further object is to provide an improved hydraulic shock absorber which, by virtue of being stressed in tension rather than in compression, the latter being the conventional practice, the weight of the unit may be substantially reduced.

A further object is to provide improved means for relieving the packing of a hydraulic shock absorber strut of the intense fluid pressures developed within the strut during deflection thereof.

Still another object is to provide means by which impact shocks of landing are controlled, said means being active to permit rapid restitution of the landing gear when the same is acted upon by gravity.

Further objects will be apparent from a reading of the subjoined specification and claims, and from an examination of the accompanying drawings, in which similar numbers indicate similar parts, and in which:

Figure 1:
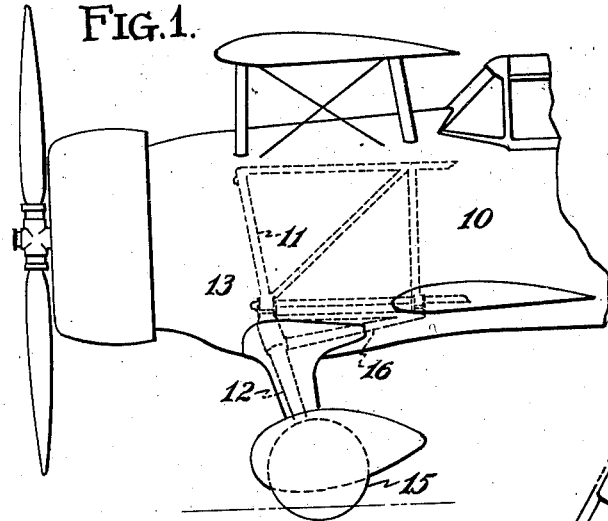
Fig. 1 is a side elevation of the forward part of an aircraft embodying the landing gear of this invention.
Figure 2:
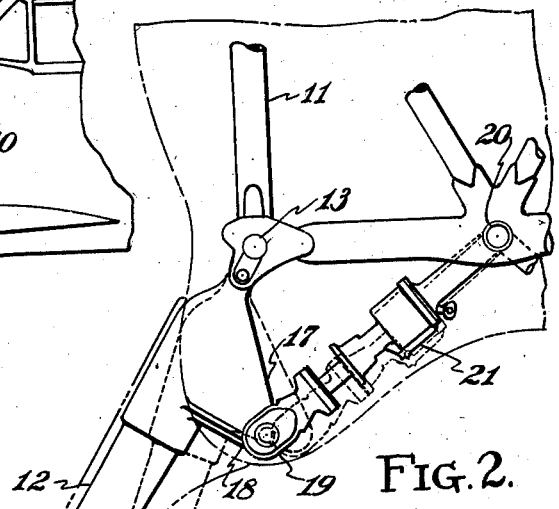
Fig. 2 is a diagrammatic front elevation showing a portion of the fuselage and landing gear.

In referring to the drawings, 10 indicates an aircraft fuselage having a skeleton framework 11, the fuselage being conventionally provided with wings, power plant and the like. To the lower outer corners of the fuselage skeleton 11, a main landing gear strut 12 is pivoted, as at 13, this strut extending downwardly and outwardly to carry a stub axle 14 on which a wheel 15 is carried for ground contact. The strut 12 may have a rearwardly extending projection 16 likewise pivoted to the fuselage skeleton through which extension drag loads on the landing gear are assumed. The strut 12 also is provided with an inward extension 17 carrying an eye 18, through which a bolt 19 passes. Centrally of the fuselage, on a pivot 20, is mounted the upper end of the shock absorber strut 21, the lower end of the strut 21 being pivoted upon the bolt 19. Fig. 2 shows in dotted lines the position of the landing gear in the flight position, wherein the weight of the strut 12 and its associated elements causes the landing gear to droop and to collapse the shock absorber strut 21 to its shortest length. Upon landing impact, the strut 12 is moved upwardly and outwardly as shown in solid lines in Fig. 2, tending to elongate the strut 21.

Figure 3:
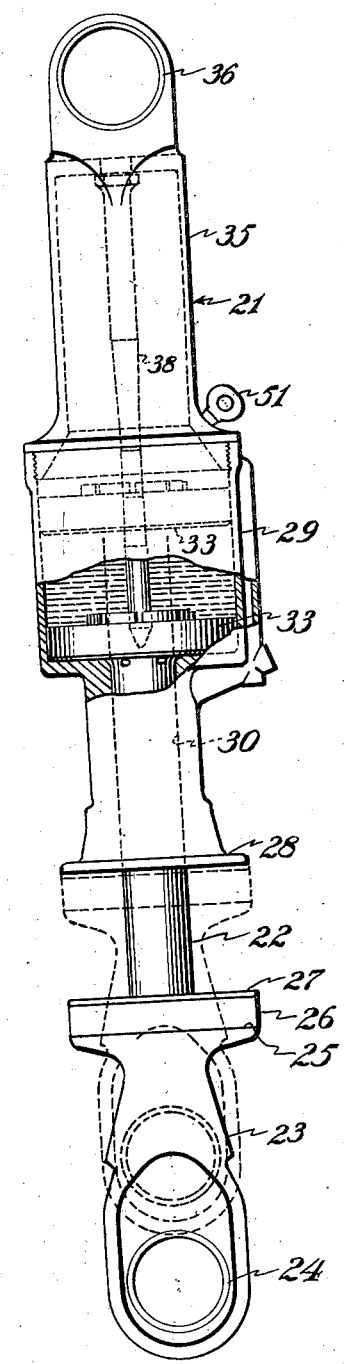
Fig. 3 is an enlarged front elevation of the tension shock absorber strut.
Figure 4:
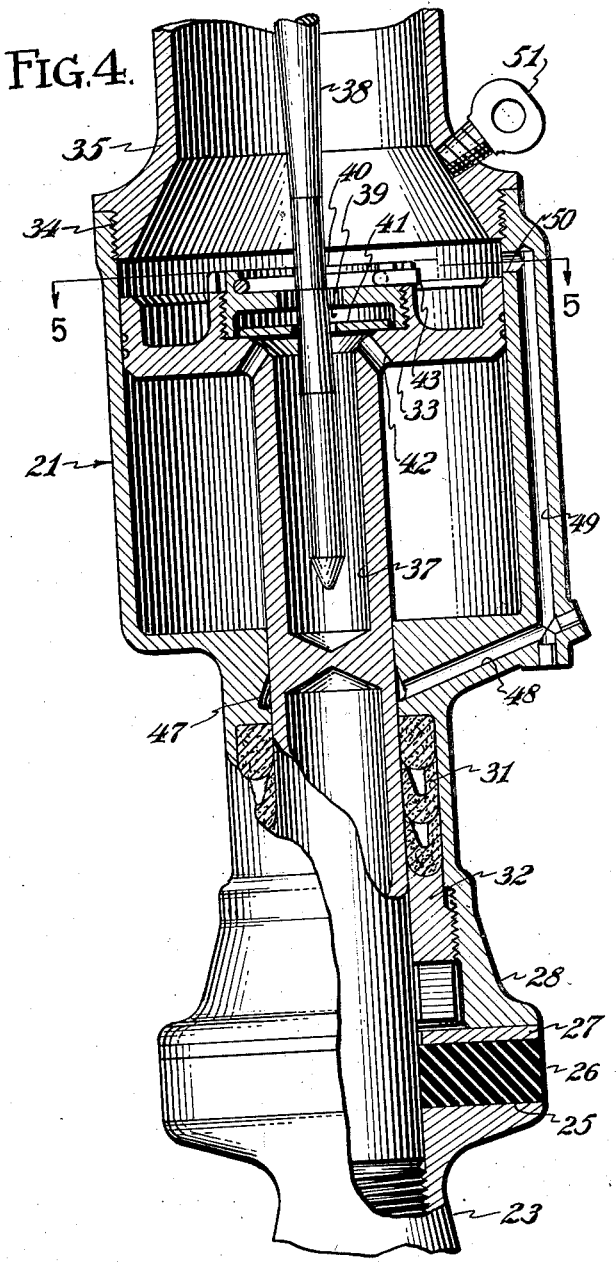
Fig. 4 is an enlarged section through the operation mechanism of the shock absorber strut.

Figs. 3 and 4 show the strut 21 in detail. The strut comprises a piston rod 22 screwed at its lower end into an abutment fitting 23 having an eye 24 for engagement with the bolt 19. On an abutment surface 25 of the fitting 23, a rubber disc 26 rests, this being superimposed by a metal washer 27 for engagement, upon collapsing of the strut, with the lower extension 28 of a cylinder 29. The extension 28 is provided with a bore 30 through which the piston rod 22 passes, the extension 28 being provided with packings 31 and a packing nut 32 to seal the piston rod within the bore 30. The piston rod, at its upper end, is provided with an integral piston 33, the periphery of which engages the walls of the cylinder 29. The top of the cylinder 29 is threaded as at 34 for engagement with a top closure 35, said closure being sealed and being provided at its upper end with an eye 36 for engagement with the pivot 20 on the aircraft fuselage. The piston rod 22 is counterbored as at 37 to receive the end of a metering pin 38 anchored to the top of the closure 35. The piston 33 is formed with a recess 39 in its upper face, the edges of the recess being threaded to receive a nut 40, thus providing a cavity within the piston head within which a flap valve 41 is adapted to seat. The nut 40 is centrally perforated with a hole of considerably greater diameter than that of the largest portion of the metering pin 38, while the valve 41 is provided with a central hole of a diameter only slightly in excess of that of the metering pin 38. Openings 42 are provided from the cavity, below the valve 41, to the lower face of the piston 33.

Figure 5:
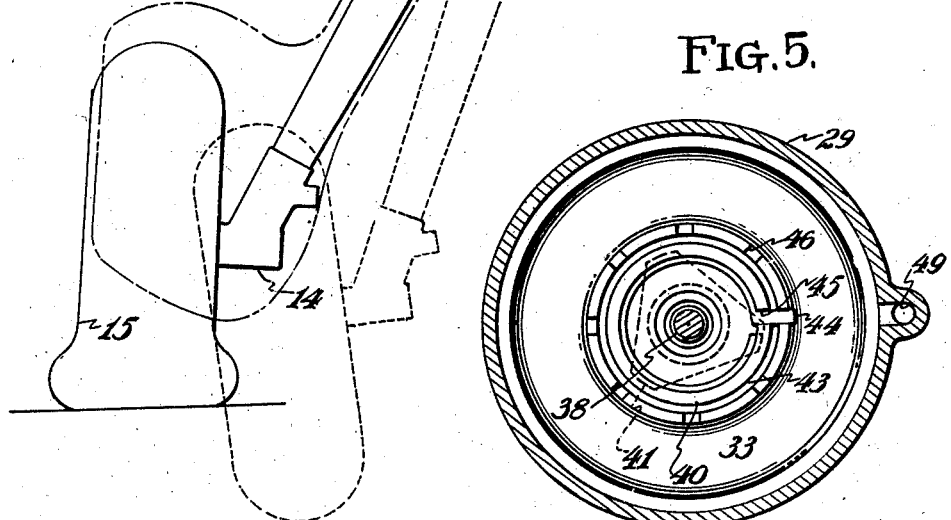
Fig. 5 is a section on the line 5—5 of Fig. 4.

As will be noted in Fig. 5, the flap valve 41 is of more or less triangular shape so that, when the valve rests upon the bottom wall of the cavity, as shown in Fig. 4, fluid contained within the strut has free passage through the openings 42, around the edges of the flap valve 41 and through the central bore of the nut 40. This position for the flap valve is obtained when the piston is pushed upwardly within the cylinder, by virtue of fluid above the piston impinging upon the valve and pressing it against the lower wall of the cavity. However, in such an action, the fluid has relatively free flow from above the piston to below the piston. Upon extension of the shock absorber, fluid below the piston must pass thereabove, through the openings 42, whereupon the flap valve is pressed against the upper wall of the cavity 39, closing off a large portion of the opening in the nut 40 and causing a restriction in the path of the shock fluid, thereby damping the extension of the shock absorber strut. It is this latter condition which accrues when the landing gear is subject to ground impact, so that landing shocks are adequately, but non-reactively, absorbed. When the aircraft has completed a landing, the edges of the piston 33 abut against the upper faces of the lower end of the cylinder 21, making a solid connection. When the aircraft is in flight, the landing gear will droop downwardly so that the upper edges of the piston approach the lower edges of the closure 35. However, they do not abut, since the washer 27 will have come into contact with the lower face of the cylinder extension 28. The rubber ring 26 will act as a buffer to prevent sudden shocks when the landing gear droops to its lowermost position.

For facility in assembling, the nut 40, when screwed into the head of the piston 33 is locked from looseness by the use of a spring ring 43 seating within an annular groove within the inner face of the nut 40, said spring ring having an extension 44 adapted to register with notches 45 and 46 cut respectively in the upper face of the nut 40 and in the upper part of the piston 33.

To minimize leakage of contained fluid from the cylinder, through the bore 30, I form an annulus 47 within the bore 30 but above the packing 31, this annulus being connected by passages 48, 49 and 50 formed in the wall of the cylinder 29, to the cylinder interior above the highest piston position. Normally, the fit of the piston rod 22 in the bore 30 is a close running fit, so that a relatively small amount of fluid will leak downwardly between the piston rod and the bore. However, when the shock absorber strut is subjected to landing impact, the pressure below the piston is built up to a very high degree, whereas the pressure above the piston is relatively low. Therefore, any leakage between the piston rod 22 and the bore 30 will collect in the annulus 47, and as the pressure builds up to a point greater than the pressure above the piston, fluid will be by-passed through the passages 48, 49, and 50 to the upper part of the cylinder. To cavity within the cylinder closure 35 will ordinarily be under atmospheric pressure and provides a clearance space into which a certain amount of oil may enter when such oil is displaced by the piston rod 30 as it enters the cylinder.

A filler plug 51 is provided in the closure 35 by which the proper amount of hydraulic fluid may be placed within the strut.

The metering pin 38 may be tapered in part to provide varying degrees of hydraulic resistance as the shock absorber strut operates.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A tension oleo strut for aircraft landing gears comprising in combination a cylinder having a reduced diameter portion at its outer end, a piston rod reciprocable through said reduced diameter portion, a packing in said reduced diameter portion for sealing said piston rod, a piston on said piston rod for engagement with said cylinder, said piston having an opening therethrough, valve means organized for substantially closing said opening upon movements of said piston rod out of said cylinder and for uncovering said opening upon movement of said piston rod into said cylinder, and a metering pin of varying cross section along its length, carried by said cylinder and engaging within said opening.

2. A tension oleo strut for aircraft landing gears comprising in combination a cylinder, a piston rod reciprocable through the end of the cylinder, a packing in said end for sealing said piston rod, a piston on the rod for engagement with the cylinder walls, said piston having an opening therethrough, valve means organized for substantially closing said opening upon movement of said piston rod out of said cylinder and for uncovering said opening upon movement of said piston rod into said cylinder, and a metering pin of varying cross section along its length carried by said cylinder and engaging within said opening, said valve means embracing said pin.

3. In a tension oleo strut comprising a cylinder, a piston slidable therein, and a hollow piston rod extending from the cylinder; said rod having a duct establishing communication between opposite sides of the piston, a metering pin fixed to the cylinder engaging within the rod hollow, a metering valve embracing the pin so loosely as to permit of fluid flow between the pin and the edge of the opening through which the pin passes, said valve being movable with and with respect to the piston and being carried thereby, and opposed valve seats in the piston upon one or the other of which said valve is adapted to seat, said valve respectively engaging one or the other of said seats and restricting fluid flow through the piston when the piston rod is withdrawn from the cylinder and permitting free fluid flow through the piston when the piston rod is pushed into the cylinder.

FRANK ERNY.